United States Patent [19]

Schoepf

[11] Patent Number: 4,666,338
[45] Date of Patent: May 19, 1987

[54] OCEAN BOTTOM SEISMOMETER RELEASE MECHANISM

[75] Inventor: Victor L. Schoepf, Carrollton, Tex.

[73] Assignee: Mobil Oil Corporation, New York, N.Y.

[21] Appl. No.: 873,156

[22] Filed: Jun. 10, 1986

Related U.S. Application Data

[63] Continuation of Ser. No. 568,306, Jan. 4, 1984, abandoned.

[51] Int. Cl.⁴ .............................................. B63C 11/00
[52] U.S. Cl. ...................................... 405/191; 441/2; 441/30
[58] Field of Search ............... 405/171, 173, 185, 190, 405/191; 114/312; 441/2, 30

[56] References Cited

U.S. PATENT DOCUMENTS

| | | | |
|---|---|---|---|
| 3,126,559 | 3/1964 | Alexander | 441/2 |
| 4,482,333 | 11/1984 | Geri et al. | 441/30 |
| 4,507,093 | 3/1985 | Norvell | 441/2 |

Primary Examiner—David H. Corbin
Attorney, Agent, or Firm—Alexander J. McKillop; Michael G. Gilman; Charles J. Speciale

[57] ABSTRACT

A method and apparatus for retrieving an ocean bottom seismometer deployed to a subsea location is disclosed wherein inflatable flexible housings are attached to cylindrical cannisters having detecting and recording equipment along with identical inflation apparatus.

6 Claims, 15 Drawing Figures

OCEAN BOTTOM SEISMOMETER RELEASE MECHANISM

This is a continuation of copending application Ser. No. 568,306, filed on Jan. 4, 1984, now abandoned.

BACKGROUND OF THE INVENTION

The present invention pertains to subsea containers and more particularly to subsea containers that have no hard wire connection to surface equipment, and are used to house equipment that is deployed, performs a function such as data collection and is retrieved to withdraw the acquired data at a subsequent time.

Presently there are several types of containers in which data gathering equipment, such as seismic data detection systems, are housed for subsea application. These containers are called ocean bottom seismometers, and have a pressurized housing with an acoustic pulse detector, power supply and recorder within.

Problems may be present in several areas when subsea containers are used. First, obtaining the data from the Ocean Bottom Seismometer (OBS) required that the unit be opened to retrieve the data. Data is usually retained by a tape recorder and the tape must be physically removed to allow playback for further processing. A door is provided with seals to protect the internal equipment from the corrosive effects of seawater and to prevent shorting of various electrical components. Opening the compartment door frequently, that is, each time the OBS is used, causes wear on the seals provided and can result in seal failure when exposed to the high pressures encountered in subsea use. Replacement of the door seals is a possible solution but it requires additional man hours in assuring proper placement of the seals and waste in replacing seals that would not fail.

Maintenance of Ocean Bottom Seismometer units adds another complication to the problem of door seals. Not only must the door be opened to physically remove the tapes from a tape recorder, but the door must also be opened to monitor the power supply. A great deal of sophisticated electronic equipment along with the tape recorder are contained in an Ocean Bottom Seismometer. As such a power supply normally a battery pack, must be provided. Normally, the power supply is located in the compartment with the recording unit to provide power for the seismic data acquisition system.

A second problem that occurs in the deployment and retrieval of Ocean Bottom Seismometers is one that is environmental related. When an OBS unit is used in an area having a muddy, almost a slurry, bottom, an OBS unit may sink into the bottom and retrieval may be hampered by the suction force exerted by the mud. An Ocean Bottom Seismometer, being used to collect seismic data, must be close coupled to the earth. Since it is being used at varying depths below the surface of the ocean it must weigh more than the water which its volume displaces. Furthermore, it must have a significant subsurface weight to resist the forces of ocean bottom currents. A slurry mud bottom does not provide a hard surface upon which the Ocean Bottom Seismometer rests. As a result, an OBS unit sinks into the mud to a point of density equilibrium, where the density of the medium below the Ocean Bottom Seismometer is greater than that of the unit itself. When an OBS unit is to be retrieved, the thick mud slurry may exert a suction force hindering its return to the ocean surface.

In prior art, a simple release of ballast has been used to increase the Ocean Bottom Seismometer's bouyancy to return to the surface. These methods have not always been successful, not only because of mud problems but also due to possible release mechanism failure.

In subsea seismic exploration, three general types of seismic data aquisition systems are presently in use. The first, most widely used, is to tow a line of acoustic pulse generators between a towing vessel and a line of acoustic pulse detectors, such as hydrophones. The acoustic pulse generators produce acoustic pulses which are reflected and refracted by subsurface formations within the earth's crust. Normally, the line of acoustic pulse detectors respond only to reflected waves since refracted waves emerge from the formation and return to the surface many miles from their point of incidence. The second and third types of data acquisition systems are used to detect refracted waves. These are an Ocean Bottom Cable (OBC) and an Ocean Bottom Seismometer (OBS).

An Ocean Bottom Cable is similar to the line of seismic pulse detectors that is towed behind a marine vessel to detect reflected seismic acoustic waves. This line of seismic pulse detectors is deployed several miles away from a marine vessel towing acoustic pulse generators and placed on the ocean bottom. The acoustic pulse detectors are close coupled to the earth surface and are used to detect refracted waves when the OBC is placed remote from the acoustic pulse generators. When the Ocean Bottom Cable is used in close proximity to the acoustic pulse generators, reflected seimic acoustic pulse are detected.

Similarly, Ocean Bottom Seismometers are used to detect and record refracted seismic acoustic pulses. An OBS unit is a self contained unit having seismic pulse detectors and tape recorders. It is deployed and placed on the ocean bottom. At a predetermined time, it begins recording refracted seismic data and continues until its recording capability has been completed. The ocean bottom seismometer receives a signal, ballast is released and the OBS unit returns to the ocean surface, where it is retrieved. Once retrieved, the data is removed from the Ocean Bottom Seismometer for further processing.

The collection of refraction data may be done by either the Ocean Bottom Cable or the Ocean Bottom Seismometer, each having applications which are impractical for the other.

SUMMARY OF THE INVENTION

The present invention provides an apparatus to supply a negative to positive bouyancy transition in a subsea Ocean Bottom Seismometer unit. Durable, inflatable bags are shaped to conform to the dimensions of the Ocean Bottom Seismometer unit. Each bag is identical but independently operated to provide reliability. When deflated, the bags are drawn against the Ocean Bottom Seismometer to reduce acoustic noise due to subsea currents. Upon command, each unit is inflated by individual compressed gas bottles to provide the total Ocean Bottom Seismometer unit with a positive bouyancy, causing it to rise to the ocean surface.

DESCRIPTION OF THE PREFERRED EMBODIMENT

The present invention provides a method and apparatus for facilitating on bottom ocean seismographic surveys.

Figure 1:
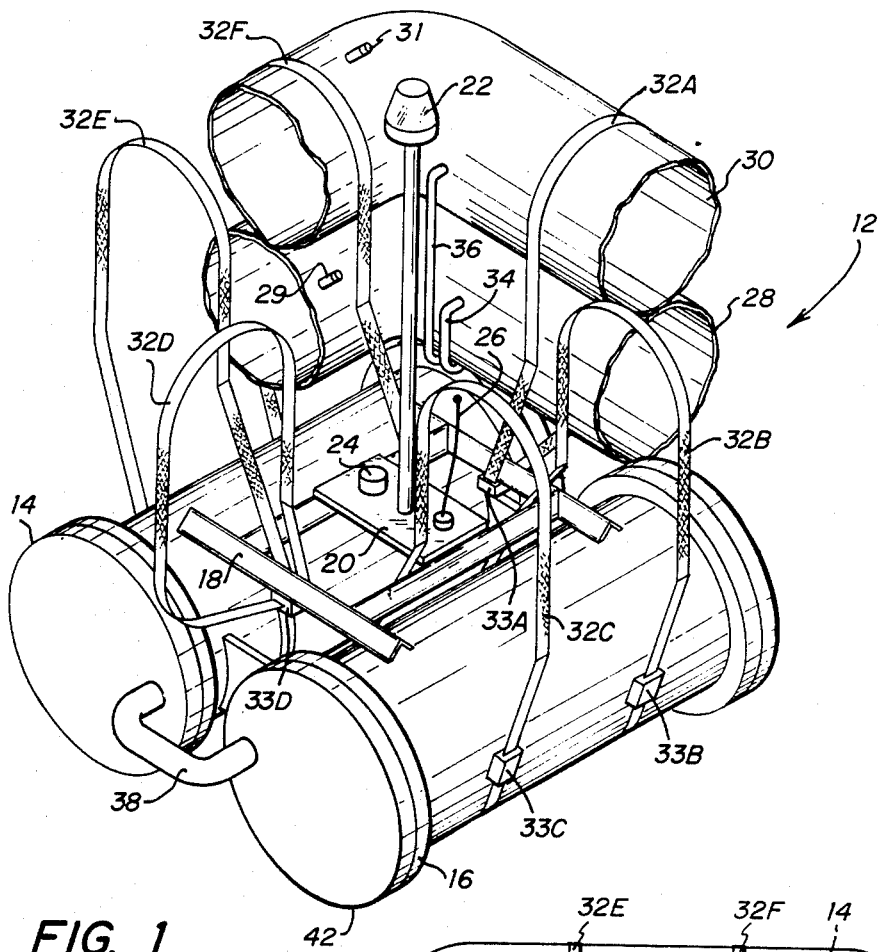
FIG. 1 is a partially cut away isometric view of an ocean bottom seismometer.

FIG. 1 is an illustration of an ocean bottom seismometer 12 having a battery cylinder 14 and a control cylinder 16 held together by frame 18, having platform 20, with beacon 22, hydrophone 24 and antenna 26 mounted thereon. An inflatable housing 28 with pressure relief valve 29 and an inflatable housing 30 with pressure relief valve 31, are held in place on cylinder 14 and cylinder 16 by retractable straps 32A through 32F, having retractors 33A through 33F respectively. High pressure hose 34 and 36 are connected to inflatable housings 28 and 30 respectively from battery cylinder 14. Connecting battery cylinder 14 to control cylinder 16 is a conduct 38 which provides power from batteries (see FIG. 8) within battery cylinder 14 to control cylinder 16. A connector 40 is provided on cover plate 42 of control cylinder 16.

Ocean bottom seismometer 12 is illustrated in cutaway form having a majority of inflatable housings 28 and 30 removed for the purposes of illustration. Inflatable housings 28 and 30 are illustrated in the retrieval position, that is with housings 28 and 30 filled with a compressed gas. The preferred embodiment uses compressed air as the compressed gas because of its availability however, any suitable compressed gas may be used to provide a positive bouyancy for ocean bottom seismometer 12.

Figure 2:
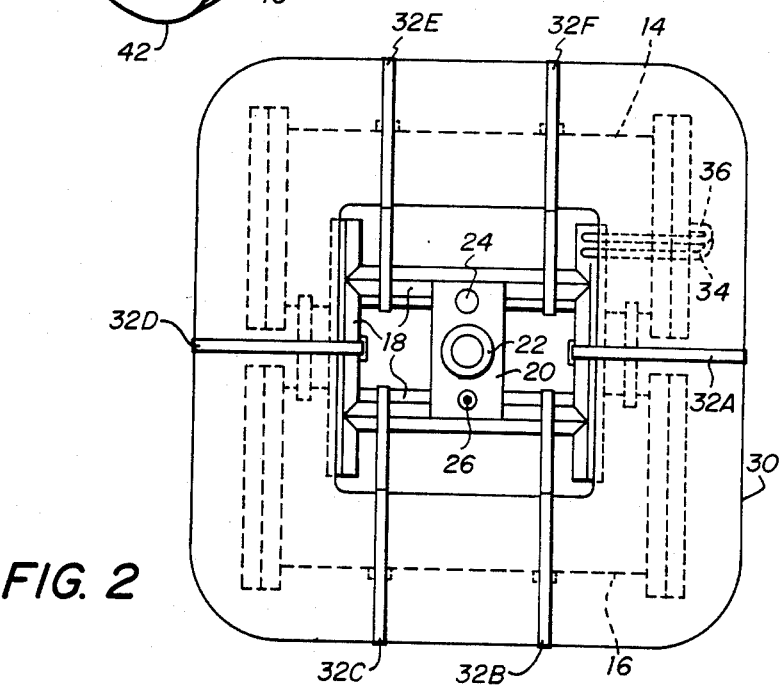
FIG. 2 is a top view of the ocean bottom seismometer of FIG. 1.
Figure 3:
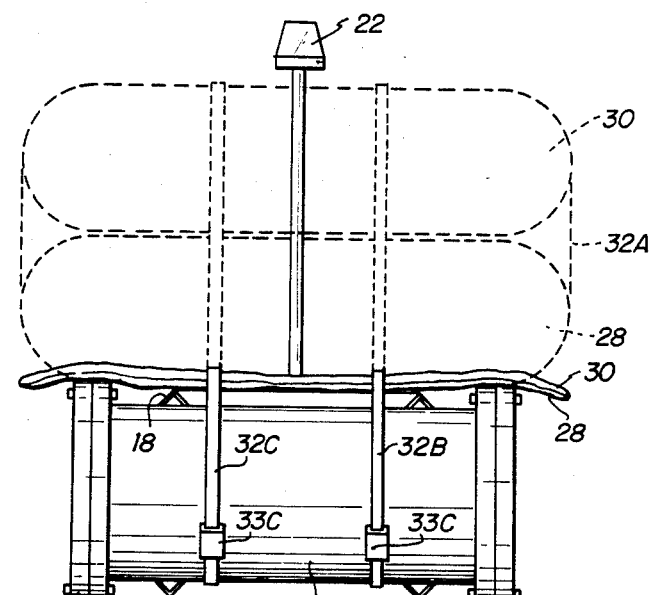
FIG. 3 is a side view of the ocean bottom seismometer of FIG. 1.
Figure 4:
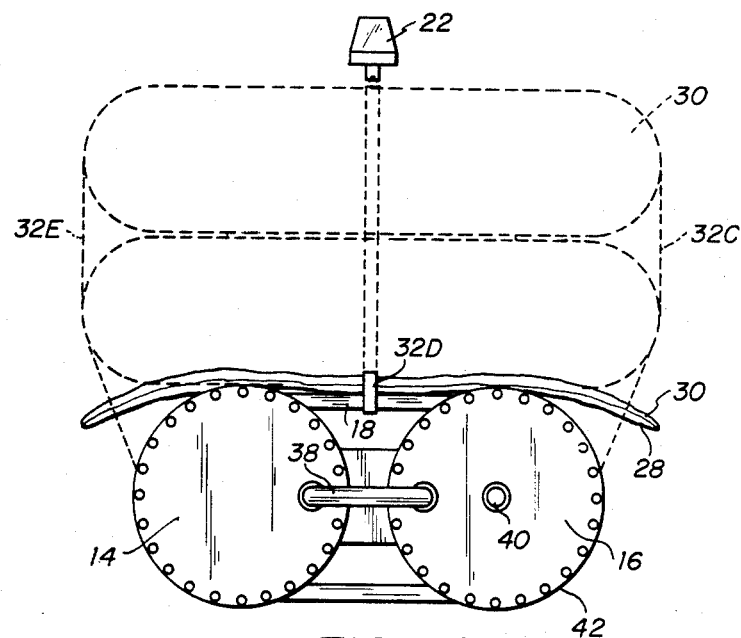
FIG. 4 is a front view of the ocean bottom seismometer of FIG. 1.

FIG. 2 is a top view of ocean bottom seismometer 12 with inflatable housings 28 and 30 illustrated in their complete form. FIG. 3 illustrates ocean bottom sesimometer 12 with inflatable housings 28 and 30 depicted in their deflated or retracted position with their inflated position illustrated in phantom. FIG. 4 is an end view of ocean bottom seismometer 12 illustrating inflatable housings 28 and 30 in their retracted or deployment position.

In operation, inflatable housings 28 and 30 are in a retracted position for deployment as illustrated in FIGS. 3 and 4. Ocean bottom seismometer 12 is deployed by placement in the ocean and allowing the unit to sink to the ocean floor. Ocean bottom seismometer 12 is constructed so that when inflatable housings 28 and 30 are retracted or uninflated, a net negative bouyancy of approximately 50 pounds is present. The negative bouyancy of ocean bottom seismometer 12 may be calculated by subtracting the weight of a volume of water equivalent to the total volume of cylinder 14 and control cylinder 16 from the land weight of ocean bottom seismometer 12.

When ocean bottom seismometer 12 is deployed, it will settle on the ocean bottom and due to its negative bouyancy or weight in water, it will become close coupled to the ocean bottom. Hydrophone 24 is used in the acquisition of seismic data along with a geophone (see FIG. 5) contained within control cylinder 16.

When seismic data acquisition has been completed, an electrical signal may be transmitted to a transponder (see FIG. 5) contained within battery cylinder 14. A transponder may be used to control electrically operated valves (see FIG. 8) connected to high pressure hoses 34 and 36 for operating compressed air sources (see FIG. 8) such as gas cylinders filled with compressed air. Upon receipt of command, electrically operated valves release compressed gas through high pressure hoses 34 and 36 to inflatable housings 28 and 30 respectively. Either housing 28 or 30 is sufficient to create a positive bouyancy capable of bringing ocean bottom seismometer 12 from the floor of the ocean to the surface. Identical, but independent systems, each comprising an inflatable housing, a high pressure hose, an electrically operated valve, and a compressed gas supply are used to assure retrieval of ocean bottom seismometer 12 once data acquisition has been completed.

During data acquisition, retractable straps 32A through 32F hold inflatable housings 28 and 30 relatively flat against battery cylinder 14 and control cylinder 16. The positioning of retractable straps 32A through 32F is such the motion of inflatable housings 20 and 30 due to ocean bottom currents is kept at a minimum. Straps 32A through 32F are withdrawn to a deployment position by retractors 33A through 33F respectively. Retractors 33A through 33F may be of any type currently used in the art, such as those used for seat belt retraction or the like. Straps 32A through 32F are preferably a nylon type to provide durability and corrosion resistance since ocean bottom seismometer 12 is to be used in a highly corrosive salt water atmosphere. Inflatable housings 28 and 30 also may be of any type currently in use in the art, however a rubberized canvas type of housing having a sufficient strength to withstand pressures of 100 psi is preferred. Pressure relief valves 29 and 31 are preferrably of a differential type while allowing a maximum pressure differential between the gas pressure within housings 28 and 30 and external pressure do not exceed 50 psi. Thus, during retrieval initiation when ocean bottom seismometer 12 is on the floor of the ocean, which may be at depths up to 1,000 feet, the pressure exerted by the compressed gas within inflatable housings 28 and 30 must be high enough to overcome the hydrostatic head of 1,000 feet. As ocean bottom seismometer 12 approaches the surface, the pressure exerted by the water will gradually decrease and relief valves 29 and 31 will allow ocean bottom seismometer 12 to surface without explosion of inflatable housings 28 and 30.

Once ocean bottom seismometer 12 has surfaced, a light may be omitted from beacon 22 to facilitate night retrieval of ocean bottom seismometer 12. In addition, antenna 26 is used to transmit a homing signal to permit electronic location of ocean bottom seismometer 12.

Control cylinder 16 comprises a cylindrical compartment 100 having flanged end 101 to receive end plate 42 and a flanged end 103 to receive end plate 104. End plate 42 has a beveled portion 105 and end plate 104 has a similar beveled portion 106. Flanged portion 101 of cylinder 100 is seated in beveled portion 105 of end plate 102 to provide a locking type fit between cylinder 100 and end plate 102. Similarly, flanged portion 103 of cylinder 100 fits into beveled portion 106 of end plate 104 to provide a locking type fit. O-ring 108 and O-ring 110 mounted in grooves 112 and 114 of end plates 102 and 104 respectively provide an air tight seal when flanges 101 and 103 are fitted in beveled portions 105 and 106 respectively. When end plates 102 and 104 are fitted in place, bolts 115 are placed in slots 116 and fastened in place by nuts 117.

Figure 5:
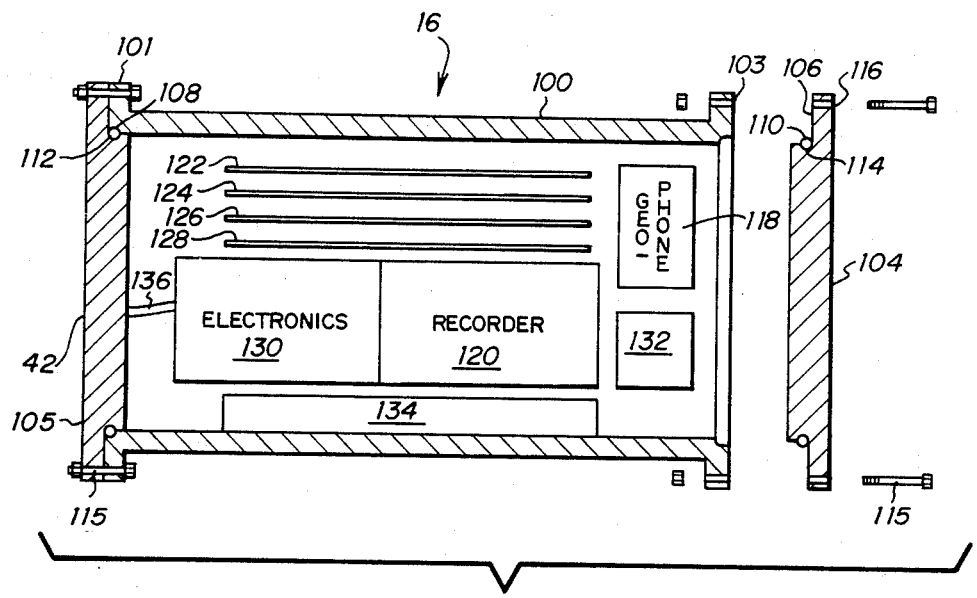
FIG. 5 is a sectional view of one compartment of the ocean bottom seismometer of FIG. 1.

FIG. 5 is a sectional view of control cylinder 16. O-rings 108 and 110 are mounted on seats 112 and 114 of end plates 42 and 104 respectively to assure an air tight seal to protect contents within main cylindrical housing 100. Within control cylinder 16 is illustrated a gimbled geophone 118, recorder 120, control cards 122, 124, 126 and 128 along with electronics unit 130 and transponder 132. Weight 134 is illustrated as being mounted along the bottom of cylindrical housing 100 to aid in directional placement of control cylinder 16.

Cylindrical compartment 100 may be of any construction currently in use in under water applications however, one-half inch stainless steel construction is preferred to permit its use in ocean depths of up to 1,000 feet. Electronic circuit 130 preferably includes the microprocessor to control recording and playback of recorder 120.

Figure 6:
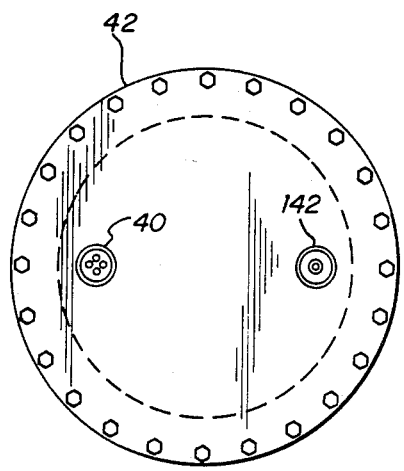
FIG. 6 is an end view of FIG. 5 with the end plate in place.

The equipment is placed within cylinder 100 and end plates 102 and 104 are bolted in place forming a sealed compartment. FIG. 6 illustrates end plate 42 having terminals 40 and 142. Terminal 142 is used to provide power to control cylinder 16 from battery cylinder 14 through connector 38 (see FIG. 1). Terminal 40 is an access terminal to electronic circuit 130 and may be used for a variety of functions. Terminal 40 is illustrated as having four connection points however, more may be added to permit additional functions by the central processing unit of electronic circuit 130. Through the use of terminal 40, signals may be fed to electronic circuit 130 to rewind recorder unit 120, set a future recording time for recorder 120 or to control playback of recorder 120. By permitting playback through connection 136 to connector 40, control cylinder 16 may remain sealed between uses to preserve the integrity of control cylinder 16. By withdrawing data from recorder 120 without removing end plates 42 or 104, O-ring seals 108 and 110 receive less wear and can assure the prevention of contamination of the data acquisition equipment within cylinder 100.

Figure 7:
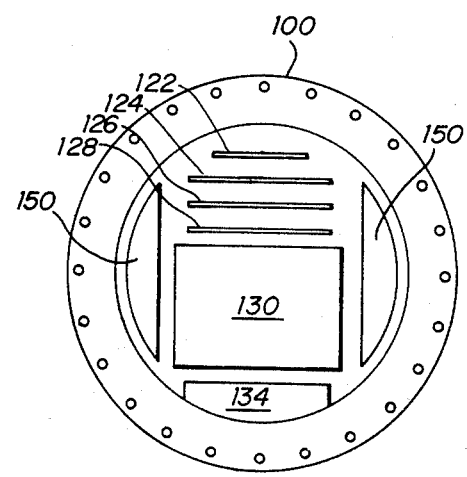
FIG. 7 is an end view of FIG. 5 with the end plate removed.

FIG. 7 illustrates the placement of control cards 122, 124, 126 and 128 along with electronic circuit 130 and weight 134 as viewed from the end of main cylinder 100. Spacers 150 are placed within cylinder 100 to prevent shifting of equipment within cylinder 100 during deployment and retrieval as well as during handling aboard ship.

Figure 8:
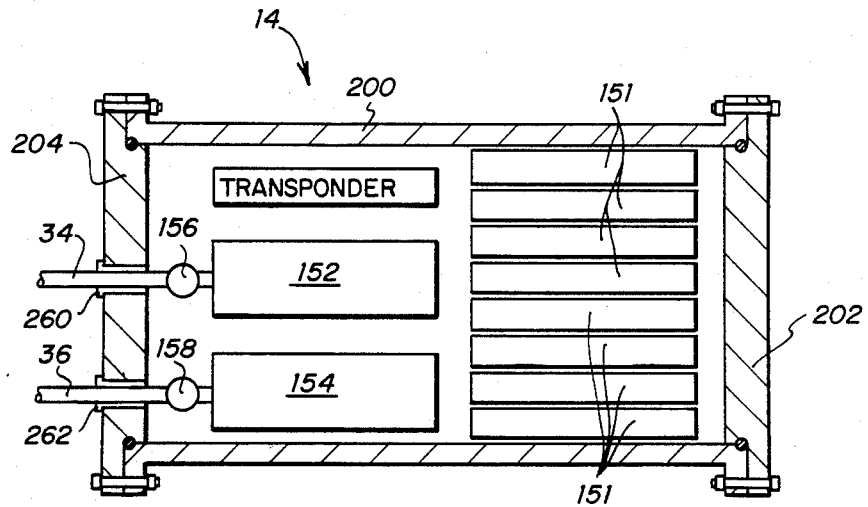
FIG. 8 is a sectional view of a second compartment of the ocean bottom seismometer of FIG. 1.

Referring to FIG. 8, a sectional view of a battery compartment 14 is illustrated as having a main cylinder 200. Contained within battery cylinder 14 are a series of battery packs 151. Placed next to battery packs 150 are gas cylinders 152 and 154 connected to high pressure hoses 34 and 36 through electrically operated valves 156 and 158 respectively.

Figure 9:
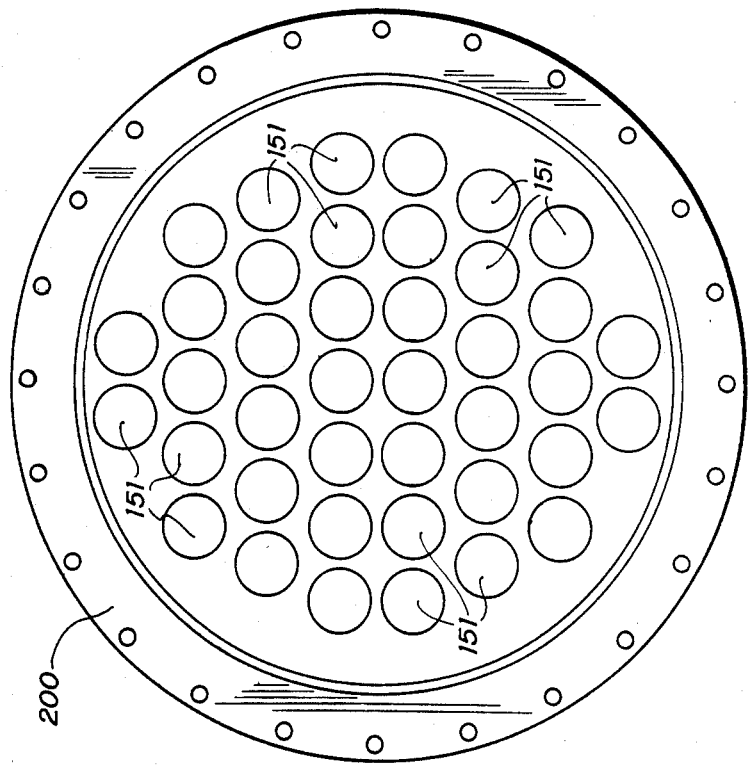
FIG. 9 is an end view of the compartment of FIG. 8.

FIG. 9 is an end view of battery cylinder 14 illustrating placement of battery packs 150 for maximum storage efficiency.

Figure 11:
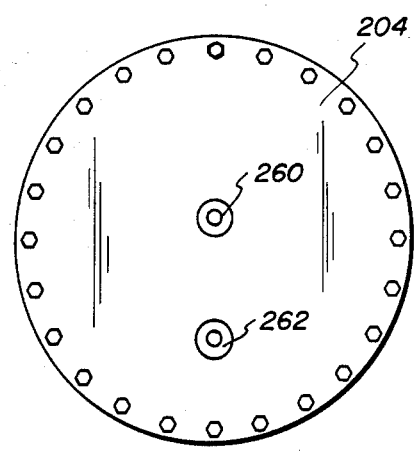
FIG. 11 is the cover plate for another end of the compartment of FIG. 8.
Figure 10:
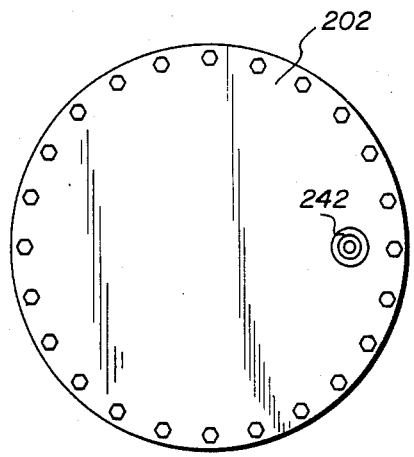
FIG. 10 is the cover plate for one end of the compartment of FIG. 8.

FIG. 10 illustrates end plate 202 with battery connector 242. FIG. 11 illustrates end plate 204 with high pressure hoze connections 260 and 262 for high pressure hozes 34 and 36 respectively.

Figure 8A:
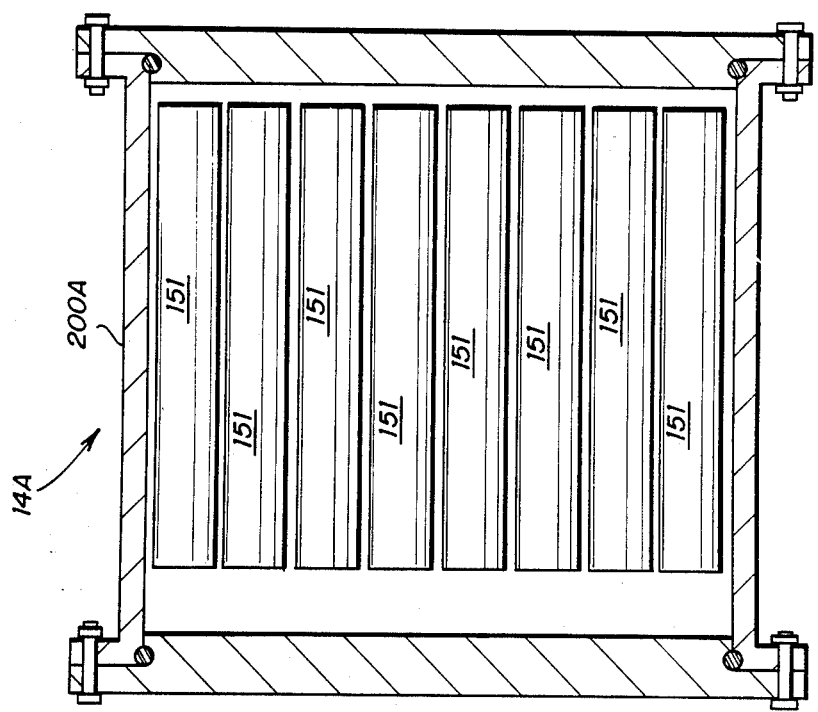
FIG. 8A is a sectional view of an alternative embodiment of a second compartment of the ocean bottom seismometer of FIG. 1.

FIG. 8A illustrates an alternate embodiment of battery cylinder 14A wherein cylindrical housing 200 may be shortened as indicated as cylindrical housing 200A to contain only battery packs 250 without gas cylinders 152 and 154 and associated equipment. As such, cylindrical housing 200A has a different end plate 204 without hose connections 260 and 262. Abbreviated cylinder 200A is illustrated in FIG. 12 which depicts the use of control cylinder 16 and battery cylinder 14 placed side by side for use in an ocean bottom cable as ocean bottom seismometer compartment 298.

Figure 13:
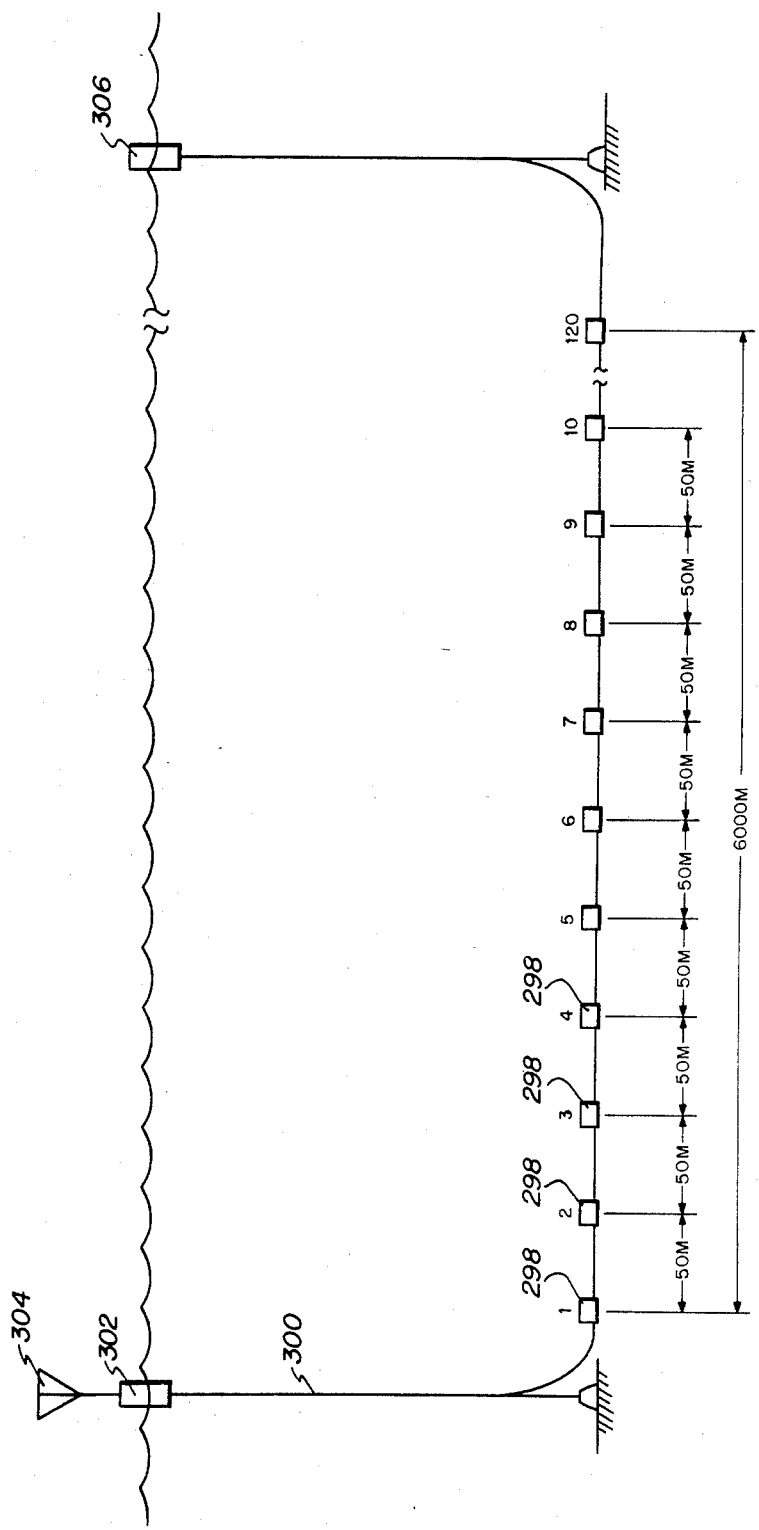
FIG. 13 is a plan view of an ocean bottom cable.

Different end plates may be placed on cylindrical housings 100 and 200A to permit fastening battery cylinder 14A next to control cylinder 16. Battery unit 200A and control unit 16 may have a male-female terminal arrangement to permit plugging of battery unit 200A into control unit 16 to comprise ocean bottom cable unit 298. Clamps 301 may be used to hold battery unit 200A plugged into control unit 16. An O-ring seal (not shown) or the like may be placed between housing 14A and housing 16 to insulate the plug in connection therebetween from salt water. A cable 300 may be used running through the center of the combination of cylinders 14 and 16 to provide connection between compartment 298. FIG. 13 illustrates the start of an ocean bottom cable at radio transiever bouy 302 having an antenna 304 extending therefrom. On bottom cable 300 extends serially through a plurality of ocean bottom seismometer compartments 298 to an end point at bouy 306. Bouys 302 and 306 mark the end points of the ocean bottom cable comprising ocean bottom seismometer units 298. The ocean bottom cable may be comprised of any number of ocean bottom seismometer units 298 however, a length of approximately 120 units is preferred. Connecting cable 300 may contain electrical connections between ocean bottom seismometer units 298 to transmit firing times, time break and other parameter information to control cylinder 16 of ocean bottom seismometer units 298.

Figure 14:
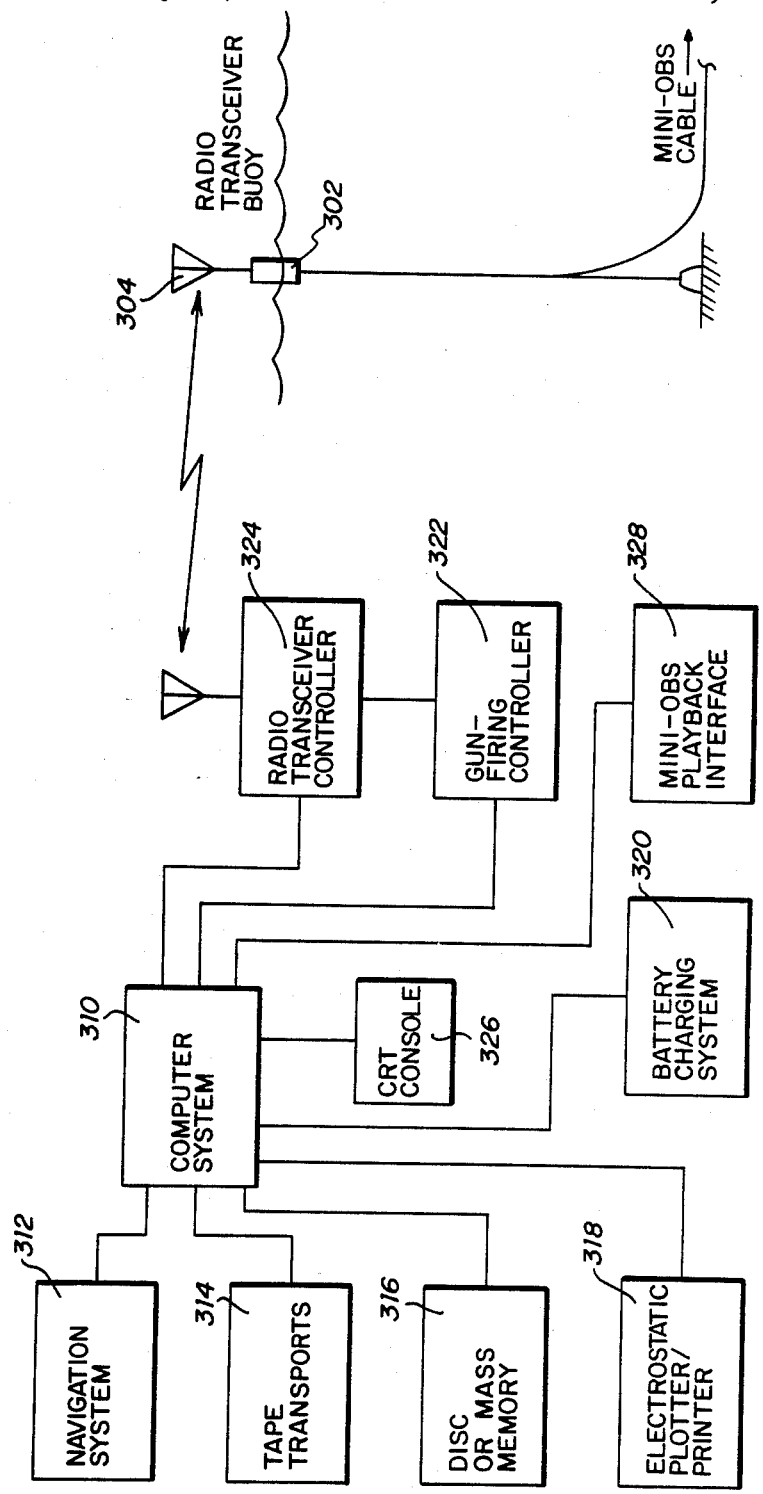
FIG. 14 is a block diagram of a control system for the ocean bottom cable of FIG. 13.

FIG. 14 illustrates a typical control system for an on bottom cable comprised of ocean bottom seismometer units. A computer system 310 receives inputs from a navagation system 312 and controls the functions of tape transports 314, mass memory 316, electrostatic plotter/printer 318, battery charging system 320. Gun firing controller 322 provides an input to computer system 310 along with radio transiever controller 324 to indicated to the self-contained ocean bottom seismometer units 298 when seismic pulse generators such as air guns are being fired to generate acoustic pulses into ocean bottom subsurface formations. Computer system 310 provides an input to cathode ray tube (CRT) console 326 which may be used to monitor the functions of the data acquisition system. Computer system 310 receives an input from playback interface 328, which may be used to withdraw data from the self-contained ocean bottom seismometer units as described in conjunction with FIG. 6.

Figure 12:
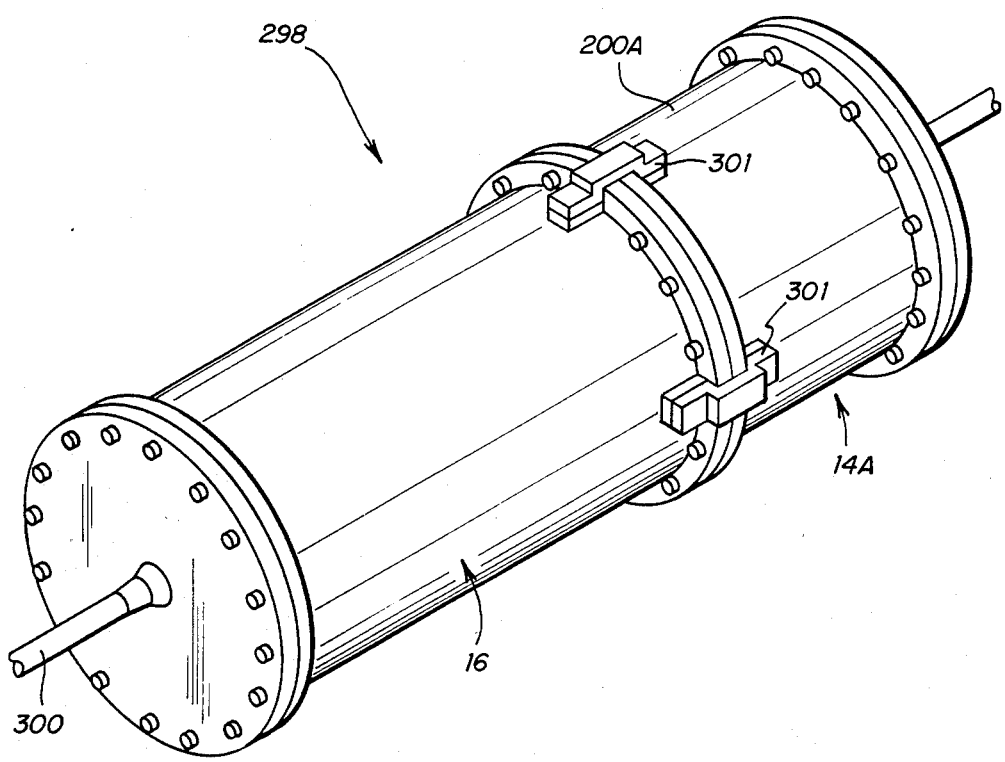
FIG. 12 is a plan view of an end to end arrangement of FIGS. 5 and 8.

The configuration illustrated in FIGS. 12 through 14 demonstrate the use of portions of ocean bottom seismometer 12 of FIG. 1 to operate as an on bottom cable. Thus, the components of the present invention may be used to acquire refraction or reflection data. The need for separate units to operate as an ocean bottom seismometer and separate units to operate as an on bottom cable is eliminated.

While the present invention has been described by way of a preferred embodiment, it is to be understood as for illustration purposes only and the present invention should not be limited thereto, but only by the scope of the following claims.

What is claimed is:

1. An on bottom release system for use on an ocean bottom seismometer unit comprising:
    housing means for containing at least two compressed gas cylinders;
    buoyancy means for providing positive buoyancy comprising at least two inflatable rings positioned one on top of the other, each ring connected to one of said compressed gas cylinders;
    inflating means connected independently to each of said gas cylinders for providing compressed gas to each of said inflatable rings;
    nylon straps mounted on said ocean bottom seismometer unit and circumscribing said inflatable rings for securing said rings to said ocean bottom seismometer unit; and
    retractor means for retracting said nylon straps in the uninflated condition of said inflatable rings so as to maintain said inflatable rings in a layflat position against said seismometer unit and allowing for extension of said nylon straps upon inflation of said inflatable rings.

2. The on bottom release system of claim 1 wherein said inflation means includes electrically operated valve.

3. The release system according to claim 2 inflation means includes transponder.

4. The release system according to claim 1 also including relief valves mounted for cooperative operation with said rings.

5. A method for retrieving an ocean bottom seismometer comprising the steps of:
    providing at least two identical and independent compressed gas sources, each having an inflatable housing attached thereto;
    releasing said compressed gas from one of said compressed gas sources into said inflatable housing attached thereto;
    releasing said compressed gas from another of said compressed gas sources into said inflatable housing attached thereto; and
    creating a positive bouyancy to bring the ocean bottom seismometer to the surface.

6. An on bottom release system for an ocean bottom seismometer comprising:
    at least two inflatable flexible housings attached to the ocean bottom seismometer, said housings shaped to approximately coincide with the outer perimeter of the ocean bottom seismometer;
    nylon straps mounted on said ocean bottom seismometer and circumscribing said inflatable flexible housings, said straps securing said housings to said ocean bottom seismometer, retractor means connected with said nylon straps and facilitating said straps to assume an extended position to allow for the expansion of said inflatable housings when said inflatable housing are supplied with said compressed gas and maintaining said straps in a normal retracted position in the uninflated condition of said inflatable housings so as to bias said housings into a layflat position against said ocean bottom seismometer;
    electrically operated valves connected between supply means for said compressed gas and said inflatable flexible housings; and
    transponder means associated with said electrically operated valves responsive to a surface transmitted signal to release said compressed gas to inflate said inflatable flexible housings.

* * * * *